UNITED STATES PATENT OFFICE.

CARL THUN, OF ELBERFELD, AND PAUL TUST AND PAUL THOMASCHEWSKI, OF VOHWINKEL, NEAR ELBERFELD, GERMANY, ASSIGNORS TO SYNTHETIC PATENTS CO., INC., OF NEW YORK, N. Y., A CORPORATION OF NEW YORK.

RED ALUMINA COLOR-LAKES OBTAINED FROM AMINOXANTHOPURPURIN-SULFONIC ACIDS.

1,090,353.     Specification of Letters Patent.     Patented Mar. 17, 1914.

No Drawing.     Application filed July 17, 1913. Serial No. 779,543.

*To all whom it may concern:*

Be it known that we, CARL THUN, PAUL TUST and PAUL THOMASCHEWSKI, doctors of philosophy, chemists, citizens of the German Empire, residing, respectively, at Elberfeld, Vohwinkel, and Vohwinkel near Elberfeld, Germany, have invented new and useful Improvements in Red Alumina Color-Lakes Obtained from Aminoxanthopurpurin-Sulfonic Acids, of which the following is a specification.

We have found that the aminoxanthopurpurin sulfonic acids having most probably the formulæ:

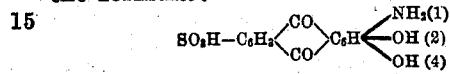

or

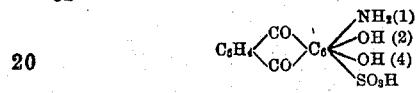

yield valuable pigments or lakes when treated with alumina as substratum. The new lakes have a valuable clear bluish-red shade and are fast to light.

In order to illustrate the new process more fully the following examples are given, the parts being by weight:

Example 1: 20 parts of aluminium sulfate (18 per cent. $Al_2O_3$) and 1 part of 1-amino-2.4-dioxyanthraquinone-3-sulfonic acid (sodium salt) having the formula:

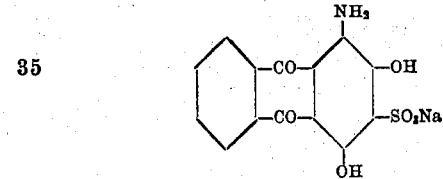

are dissolved in 180 parts of hot water and the lake is precipitated from the filtered solution with a solution of 80 parts of a 10 per cent. solution of sodium carbonate. The lake is filtered off, washed, dried and ground. It shows a deep purple red color.

Example 2: 1 part of 1-amino-2.4-dioxyanthraquinone-3-sulfonic acid (sodium salt) are dissolved in water. 150 parts of water and the filtered solution is boiled up with 47 parts of alumina hydrate in paste (10 per cent. $Al_2(OH)_6$). The lake is then filtered off, washed, dried and ground.

Any other method for producing pigments or lakes can be used.

We claim:—

1. The new red alumina color lakes prepared from aminoxanthopurpurin sulfonic acids and containing aluminum, said lakes being distinguished by their valuable bluish-red shade and their fastness to light, substantially as described.

2. The new red alumina color lake prepared from 1-amino-2.4-dioxyanthraquinone-3-sulfonic acid and containing aluminum, said lake being distinguished by its valuable purple red shades and its fastness to light, substantially as described.

In testimony whereof we have hereunto set our hands in the presence of two subscribing witnesses.

CARL THUN.   [L. S.]
          PAUL TUST.   [L. S.]
          PAUL THOMASCHEWSKI.   [L. S.]

Witnesses:
    HELEN NUFER,
    ALBERT NUFER.